(12) United States Patent
Gupta et al.

(10) Patent No.: US 11,170,758 B2
(45) Date of Patent: Nov. 9, 2021

(54) SYSTEMS AND METHODS FOR PROVIDING NOTIFICATIONS WITHIN A MEDIA ASSET WITHOUT BREAKING IMMERSION

(71) Applicant: Rovi Guides, Inc., San Jose, CA (US)

(72) Inventors: Vikram Makam Gupta, Karnataka (IN); Prateek Varshney, Karnataka (IN); Madhusudhan Seetharam, Karnataka (IN); Ashish Kumar Srivastava, Karnataka (IN); Harshith Kumar Gejjegondanahally Sreekanth, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 168 days.

(21) Appl. No.: 16/144,395

(22) Filed: Sep. 27, 2018

(65) Prior Publication Data

US 2020/0105245 A1   Apr. 2, 2020

(51) Int. Cl.
| | |
|---|---|
| *G10L 13/08* | (2013.01) |
| *H04W 68/00* | (2009.01) |
| *G10L 13/033* | (2013.01) |
| *G06F 40/205* | (2020.01) |
| *G06F 40/279* | (2020.01) |
| *G10L 13/00* | (2006.01) |
| *H04M 1/72433* | (2021.01) |
| *H04M 1/72442* | (2021.01) |

(52) U.S. Cl.
CPC .......... *G10L 13/08* (2013.01); *G06F 40/205* (2020.01); *G06F 40/279* (2020.01); *G10L 13/00* (2013.01); *G10L 13/033* (2013.01); *H04M 1/72433* (2021.01); *H04W 68/005* (2013.01); *H04M 1/72442* (2021.01); *H04M 2201/39* (2013.01)

(58) Field of Classification Search
USPC ........ 704/208–210, 246, 247, 251, 252, 260
See application file for complete search history.

(56) References Cited

U.S. PATENT DOCUMENTS

| | | | |
|---|---|---|---|
| 7,761,892 B2 | 7/2010 | Ellis | |
| 9,129,602 B1 | 9/2015 | Shepard | |
| 9,311,043 B2* | 4/2016 | Rottier | G06F 3/0482 |
| 10,365,887 B1* | 7/2019 | Mulherkar | G06F 3/167 |
| 2003/0065790 A1 | 4/2003 | Loveland | |
| 2006/0252457 A1* | 11/2006 | Schrager | H04M 1/6066 455/556.1 |
| 2013/0144595 A1* | 6/2013 | Lord | G06F 40/58 704/2 |
| 2013/0144603 A1* | 6/2013 | Lord | H04N 5/44543 704/9 |
| 2013/0144619 A1* | 6/2013 | Lord | H04M 3/56 704/235 |

(Continued)

Primary Examiner — Leonard Saint Cyr
(74) Attorney, Agent, or Firm — Haley Guiliano LLP

(57) ABSTRACT

Systems and methods for providing notifications without breaking media immersion. A notification delivery application receives notification data while a media device provides a media asset. In response to receiving the notification data while the media device provides the media asset, the notification delivery application generates a voice model based on a voice detected in the media asset. The notification delivery application converts the notification data to synthesized speech using the voice model and generates, by the media device, the synthesized speech for output at an appropriate point in the media asset based on contextual features of the media asset.

20 Claims, 13 Drawing Sheets

(56) References Cited

U.S. PATENT DOCUMENTS

2017/0346872 A1* 11/2017 Naik .................. G01C 21/3661
2018/0190264 A1*  7/2018 Mixter ................... H04L 67/26
2018/0199131 A1*  7/2018 Hodges ............... H04M 1/6066

* cited by examiner

200

Synthesized Speech —202

Insertion Point Detection

Output Playback

SYSTEMS AND METHODS FOR PROVIDING NOTIFICATIONS WITHIN A MEDIA ASSET WITHOUT BREAKING IMMERSION

BACKGROUND

The present disclosure is directed to notification systems, and more particularly to notification systems that provide notifications during media consumption.

SUMMARY

The advancement of digital transmission of media content has increased the consumption of media and the development of applications. As applications compete to grab users' attention through notifications, conventional notification systems are plagued by delivery methods that are invasive, distracting, and overwhelming. In particular, conventional notification systems fail to provide a clean way of seamlessly integrating notifications with a user's regular activities, such as when consuming media content. For example, when a user is trying to focus on an audio lecture, a conventional notification system will output a potentially distracting notification to a user, thus breaking the user's focus and immersion in the audio lecture.

Systems and methods are thus described herein for providing notifications without breaking media immersion. In one embodiment, while a user is consuming media on a media device, a notification delivery application receives notification data pertaining to the user. In order to seamlessly provide the user with the notification data without breaking the user's immersion in the media, the notification delivery application generates the notification data in an audio format and outputs it within the media that the user is consuming. As seamless integration into the media requires natural transitions between the content of the media and the notification data output, the notification delivery application generates the notification data output to have a resemblance to the audio content of the media. More specifically, the notification delivery application detects a voice in the media that the user is consuming and produces a voice model based on the voice. The notification delivery application then generates synthesized speech that recites the notification data using the voice model (e.g., a read aloud of the notification data in the voice captured by the voice model). When providing the notification data to the user, the notification delivery application outputs the synthesized speech at an appropriate point in the media based on the contextual features of the media.

For example, a user may be listening to an audiobook on his/her smartphone. The smartphone may receive a notification generated by an application (e.g., Messenger™). The notification may indicate the receipt of a message from the user's friend stating, "let's hang out tomorrow." In response to determining that the user is listening to a narration made by Oprah in the audiobook, a notification delivery application generates a voice model that emulates Oprah's voice. The notification delivery application then parses the notification and uses natural language processing to recite the parsed data in a seamless manner within the audiobook. For example, the notification delivery system determines, based on metadata analysis, that there is a silence in the audiobook at the end of a chapter. Suppose that the name of the user's friend is Mark. In response to identifying the playback position in the audiobook where the silence occurs, the notification delivery system generates synthesized speech stating, "you received a message from Mark stating, 'let's hang out tomorrow.'" In particular, the synthesized speech is generated using the voice model of Oprah's voice. Thus, the notification delivery application delivers the notification to the user within the media that the user is consuming, without the user being distracted by an external display. The seamless transition between the audio in the audiobook and the synthesized speech further ensures that the user's immersion in the audiobook is not broken.

The systems and methods for notification delivery may also be implemented in real-time. For example, the user may be listening to a radio broadcast of the news while driving. The notifications received by the user's smartphone may be global positioning system (GPS) directions. Accordingly, the notification delivery application may generate a voice model of an anchor in the radio broadcast and deliver, during the radio broadcast, directional notifications using synthesized speech of the anchor. The user therefore can focus on driving while enjoying the radio broadcast, rather than being distracted by various notifications on an external display (e.g., a smartphone screen) or external audio (e.g., the GPS audio).

In some embodiments, the notification delivery application may detect a voice in the audio of the media by comparing the frequency and temporal characteristics of the audio with known vocal characteristics of human speech. More specifically, the notification delivery application may determine the amount of similarities between the frequency and temporal characteristics of the audio and the vocal characteristics. In response to determining that the frequency and temporal characteristics correspond to the vocal characteristics (e.g., the similarities surpass a threshold), the notification delivery application may determine that the audio component comprises a voice.

There are several methods with which the notification delivery application may determine the point in the media asset for outputting the synthesized speech. In one embodiment, the notification delivery application may take the importance/priority of the notification data into consideration. More specifically, the notification delivery application may parse the notification data into textual information and identify a keyword from the textual information. The notification delivery application may determine whether the identified keyword (e.g., "urgent") appears in a predetermined database of priority keywords. The predetermined database of priority keywords may also indicate the priority level of the keyword (e.g., low priority, high priority). In response to determining that the identified keyword appears in the predetermined database of priority keywords, the notification delivery application may prioritize the output of the synthesized speech (e.g., the synthesized speech may be outputted more immediately or at a later time).

In some embodiments, when determining the point in the media for outputting the synthesized speech, the notification delivery application may determine an access delay associated with the notification type of the notification data. The access delay is indicative of the time difference between the time when a notification is received and the time when the notification is accessed. The access delay may also be an average time difference calculated over a period of time. The notification delivery application may determine the access delay based on historical data of receipt times and access times of notifications on the media device or by any device of a user. The notification delivery application may thus determine the point in the media to output the synthesized speech by adding the access delay to the receipt time of the notification data relative to the playback of the media.

The notification delivery application may also take silence periods into consideration when determining the point for outputting the synthesized speech. A silence period represents a time period in the media in which no voices are detected or a pause is taken (e.g., at the end of a sentence). The notification delivery application may retrieve metadata of the media and identify, based on the metadata, a plurality of silence periods in the media. The notification delivery application may thus determine a candidate point in the media asset that is within the silence period and identify the candidate point as the point in the media asset for outputting the synthesized speech. This ensures that the synthesized speech is outputted with a natural transition and does not cut off the voice in the media.

In some embodiments, when determining the point in the media asset for outputting the synthesized speech, the notification delivery application may search for keywords in the media asset that can be followed by the synthesized speech. In this case, the contextual features of the media asset indicate keywords such as "hey," "listen," "look," etc. The notification delivery application may retrieve a keyword from memory and monitor the media for the keyword. In response to detecting the recitation of the keyword in the media, the notification delivery application may output the synthesized speech.

When determining the point in the media asset for outputting the synthesized speech, the notification delivery application may also attempt to grab the user's attention by using contrasting voices. For example, the notification delivery application may detect that a different voice is being outputted in the media asset and determine a point in the media when the different voice ceases output. In response to detecting that the different voice has ceased output, the notification delivery application outputs the synthesized speech. Because the synthesized speech is based on a voice model that is unique from the different voice, the notification delivery application is able to deliver the notification data to the user in a distinctive audio output while still maintaining media immersion.

When generating the synthesized speech for output at the point in the media, the notification delivery application may pause the media at the point and then generate the synthesized speech. In response to completing output of the synthesized speech, the notification delivery application may then un-pause the media at the point. This prevents the user from losing information in the media while the synthesized speech is outputted.

In some embodiments, when generating the synthesized speech for output at the point in the media, the notification delivery application may adjust the frequency of the synthesized speech such that the synthesized speech is outputted at a different frequency than the normal frequency of the voice that is emulated. The adjustment in frequency causes a change in tone and prevents the notification data from being interpreted as content within the media. Thus, if the tone of the voice in the media is dry, the tone of the synthesized speech can stand out from the media if the synthesized speech is slightly more upbeat.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
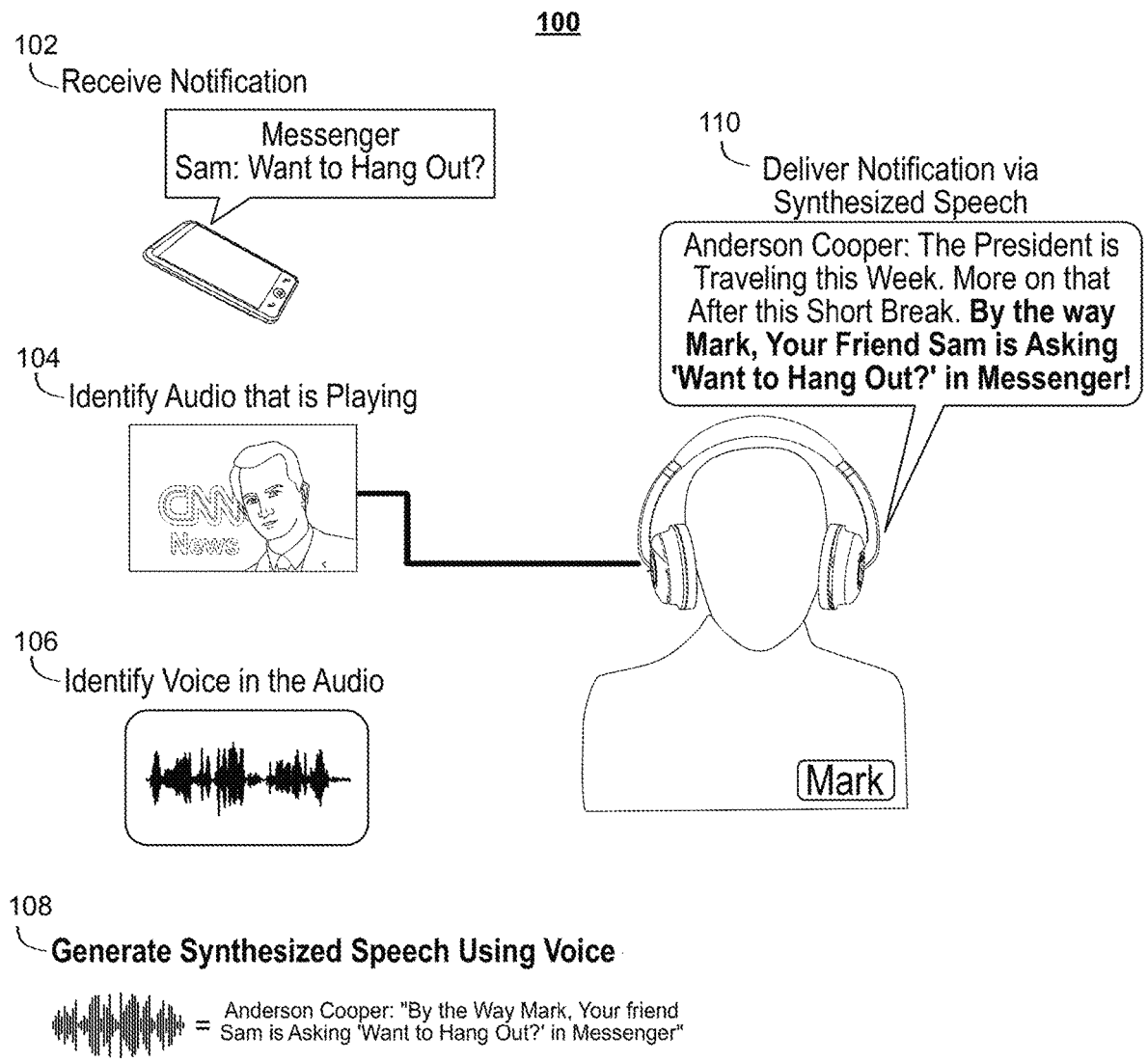
FIG. 1 shows an illustrative example of a scenario for providing notifications as synthesized speech within a media asset without breaking media immersion, in accordance with some embodiments of the disclosure.

FIG. 1 shows an illustrative example of a scenario for providing notifications as synthesized speech within a media asset without breaking media immersion, in accordance with some embodiments of the disclosure. Consider scenario 100 in which a user (depicted in FIG. 1 as a silhouette and tagged "Mark") is listening to an audio feed called "CNN News" via wireless headphones connected to his smartphone. In scenario 100, a notification delivery application may be installed on the smartphone of the user. However, it should be noted that the notification delivery application may instead be present on a remote server that can communicate with the smartphone of the user.

At 102, the notification delivery application receives notification data while an audio feed of "CNN News" is being outputted on the smartphone and provided to the user via the wireless headphones. The notification data, as depicted in FIG. 1, is a text from a friend of the user asking, "want to hang out?" and is generated by the application, Messenger™. In conventional systems, the text is generated on the display of the smartphone. However, this may be distracting to the user and may break the immersion of the user in the audio feed of "CNN News" (e.g., the user may read the notification and while reading, miss content that is important in the audio feed, due to the lack of attention).

In some cases, the media asset that the smartphone outputs contains only a visual component (e.g., text, photos, slideshows, silent videos, etc.) Accordingly, at 104, the notification delivery application determines whether the media asset "CNN News" contains an audio component based on the metadata of "CNN News." The metadata may be retrieved by the notification delivery application from the memory of the smartphone or an alternate source (e.g., the source of "CNN News"). The metadata may include details about the media asset "CNN News" such as the source, content type, stream size, file type (e.g., the extension). Based on the file type (e.g., mp3), the notification delivery application may determine that "CNN News" contains an audio component.

At 106, the notification delivery application identifies a voice in the audio component. The notification delivery application may detect a voice in the audio component of "CNN News" by comparing the audio characteristics of "CNN News" with the vocal characteristics of human speech. In order to detect a primary voice, the notification delivery application may use signal processing (e.g., a combination of low-pass, high-pass and band-pass filters) to isolate voices in the audio component from background noise and music. The audio characteristics (e.g., frequency and temporal information) may then be compared to the vocal characteristics of human speech by the notification delivery application. The notification delivery application may further quantify the comparison (e.g., a coefficient of correlation, summation of differences) and determine whether, for example, the coefficient of correlation exceeds a threshold value (e.g., the minimum similarity required to classify the filtered audio component as a voice). In response to determining that the coefficient of correlation exceeds the threshold value, the notification delivery application may determine that the audio component includes a voice. In some embodiments, the notification delivery application may determine that the audio component includes a voice by using voice recognition techniques and natural language processing to parse the audio component into words. In response to determining that the audio component may be parsed into words, the notification delivery application may determine that the audio component includes a voice.

At 108, the notification delivery application generates synthesized speech based on the voice. For example, the voice in "CNN News" may belong to the anchor Anderson Cooper. Accordingly, the notification delivery application will deliver the notification data in the voice of the Anderson Cooper. The notification delivery application may generate a voice model based on the detected voice (e.g., a voice model that emulates the voice of Anderson Cooper). In some embodiments, the notification delivery application may analyze audio samples in the media asset "CNN News" that share the frequency and temporal characteristics of the detected voice. Audio samples with similar frequency and temporal characteristics may be from the same voice (e.g., other portions of the media asset in which Anderson Cooper's voice is detected). The notification delivery application may use voice recognition techniques to parse those audio samples into words and generate a database of audio clips, in which each audio clip represents a recitation of a unique word said in the voice. The voice model in these embodiments is thus a database of audio clips. It should be noted that the audio samples may also be retrieved from other media assets featuring the voice. For example, the notification delivery application may retrieve additional media assets associated with Anderson Cooper. In some embodiments, the audio clips and the associated parsed words corresponding to the audio clips are provided as a dataset for a neural network that identifies frequency and temporal characteristics in the media asset and maps them to the syllables in the associated parsed words. The voice model in these embodiments is therefore a neural network that receives words/text as an input and outputs the words/text as synthesized speech (e.g., a recitation of the words/text in the voice). In this example, the notification delivery application generates the synthesized speech based on Anderson Cooper's voice.

The notification delivery application may additionally utilize text templates that specify the source of the notification when generating the synthesized speech. For example, the notification delivery application may retrieve a text template stored in memory that states, "By the way [name of user], your [source's relationship to user] [name of source] is [action] [notification data] in [application]." The notification delivery application may fill in the fields indicated in the brackets with the relevant information based on a user profile of the user and the notification data. For example, the notification delivery application may generate the statement "By the way Mark, your friend Sam is asking 'want to hang out?' in Messenger." The generated statement is then converted into the synthesized speech by the notification delivery application using the voice model. The synthesized speech is thus an audio output in which "By the way Mark, your friend Sam is asking 'want to hang out?' in Messenger" is recited in Anderson Cooper's voice.

At 110, the notification delivery application outputs the synthesized speech at a point in the media asset "CNN News." In order to ensure a seamless transition between the content of media asset and the synthesized speech, the notification delivery application determines a point in the media asset in which the synthesized speech can be outputted without breaking media immersion. This determination method is based on contextual features of the media asset and is discussed in further detail in FIG. 2. As depicted in FIG. 1, the synthesized speech may be outputted at the end of a sentence. For example, after Anderson Cooper says "The President is traveling this week. More on that after this short break," the notification delivery application may output "By the way Mark, your friend Sam is asking 'want to hang out?' in Messenger." Thus, the user hears the notification data within the media asset "CNN News" and is not distracted by the display of the notification on the smartphone.

Figure 2:
FIG. 2 shows an illustrative example of a scenario for inserting synthesized speech into a media asset, in accordance with some embodiments of the disclosure.
Figure 2:
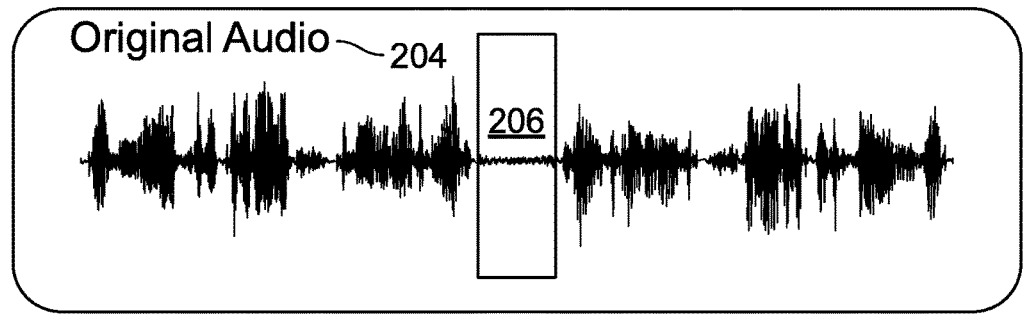
Figure 2:

FIG. 2 shows an illustrative example of a scenario for inserting synthesized speech into a media asset, in accordance with some embodiments of the disclosure. As described in FIG. 1, the notification delivery application generates synthesized speech based on the voice model to emulate the voice in the media asset. Synthesized speech 202 is an audio signal that depicts amplitude over time. Original audio 204 represents the audio component of the media asset "CNN News" and also graphs amplitude over time. During insertion point detection, the notification delivery application analyzes the contextual features of the media asset (e.g., silence periods, importance of content, keywords, etc.) and determines a point in the media asset to output the synthesized speech. For example, the notification delivery application may determine silence period 206 in which there is no voice being outputted. Silence period 206 may occur at the end of a sentence, between long pauses, or at the end of a section in the media asset (e.g., before a transition to a commercial).

The notification delivery application may then identify a point within silence period 206 to insert synthesized speech 202. The candidate point may be any arbitrary point in silence period 206. In some embodiments, the notification delivery application may pause the media asset, output the synthesized speech, and then un-pause the media asset once the synthesized speech has been outputted completely. In some embodiments, the notification delivery application may simply alter the media asset by inserting the synthesized speech into playback. For example, output audio 208 represents a version of the media asset in which synthesized speech 210 has been integrated into the media asset. As depicted in FIG. 2, the notification delivery application increases the duration of the media asset and generates playback of output audio 208.

As referred to herein, the terms "media asset" and "content" should be understood to mean electronically consumable user assets, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same.

As referred to herein, the phrase "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

Metadata may include program information, notification delivery application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
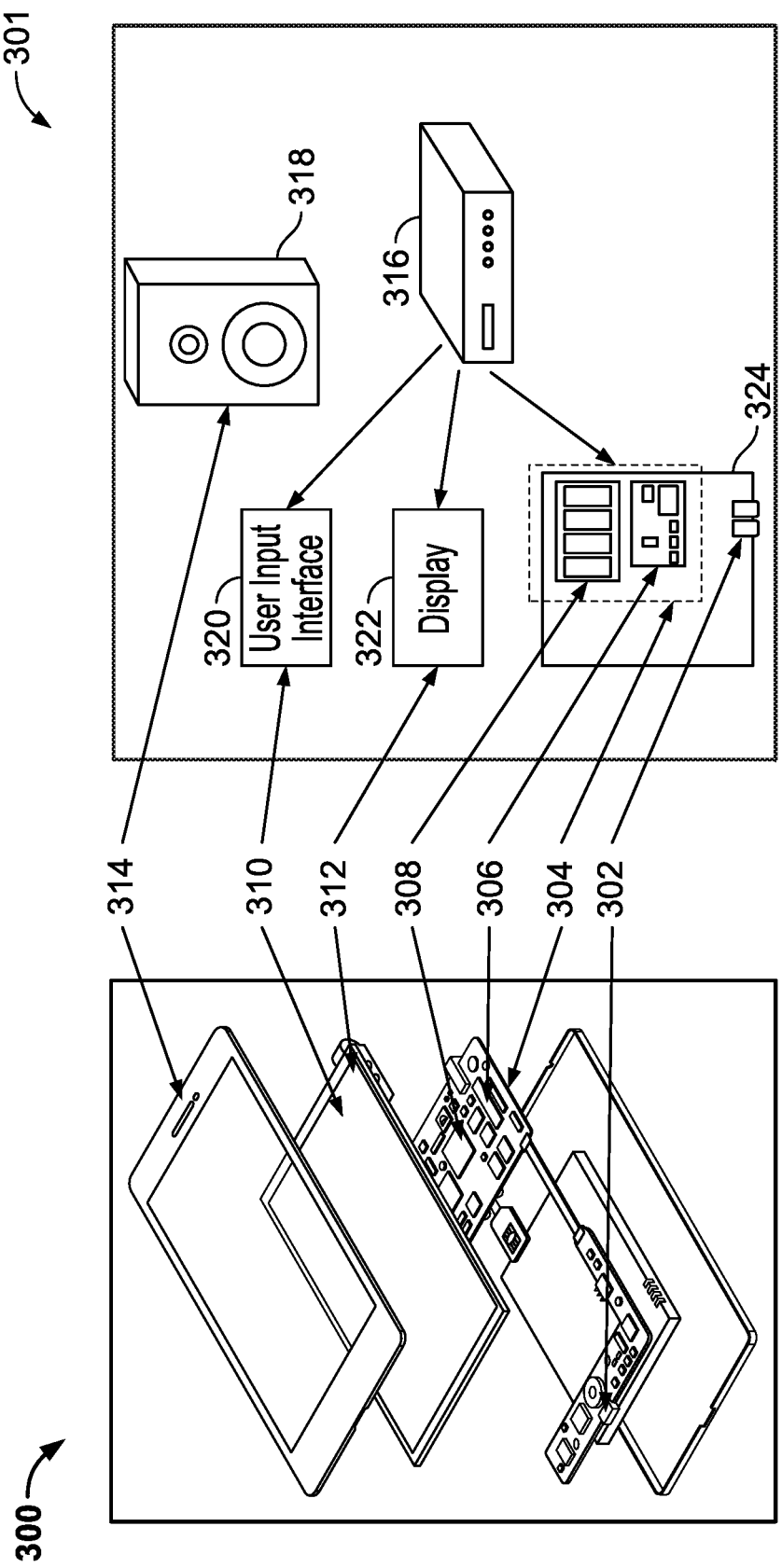
FIG. 3 is a diagram of an illustrative user equipment device in accordance with some embodiments of the disclosure.

FIG. 3 shows a generalized embodiment of illustrative media devices 300 and 301. As depicted, media device 300 may be a smartphone or tablet, whereas media device 301 may be a home media system that includes equipment device 316 (e.g., a set-top box, CPU, video-game console, etc.) powered by processor 324. Media devices 300 and 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a notification delivery application stored in memory (i.e., storage 308). Specifically, control circuitry 304 may be instructed by the notification delivery application to perform the functions discussed above and below.

In client-server based embodiments, control circuitry 304 may include communications circuitry suitable for communicating with a notification delivery application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 4, may be used to supplement storage 308 or instead of storage 308.

Control circuitry 304 may include audio generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the media device to receive and to display, to play, or to record content. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 308 is provided as a separate device from user equipment 300, the tuning and encoding circuitry (including multiple tuners) may be associated with storage 308.

A user may send instructions to control circuitry 304 using user input interface 310 of media device 300 or user input interface 320 of media device 301. User input interface 310 and user input interface 320 may be any suitable user interface, such as a remote control, mouse, trackball, keypad, keyboard, touch screen, touchpad, stylus input, joystick, voice recognition interface, or other user input interfaces. Display 310 may be a touchscreen or touch-sensitive display. In such circumstances, user input interface 310 may be integrated with or combined with display 312. Display 322 may be provided as a stand-alone device or integrated with other elements of media device 301. Speakers 314 may be provided as integrated with other elements of media device 300. In the case of media device 301, speakers 318 may be stand-alone units (e.g., smart speakers). The audio component of videos and other content displayed on display 322 may be played through speakers 318. In some embodiments, the audio may be distributed to a receiver (not shown), which processes and outputs the audio via speakers 318.

The notification delivery application may be implemented using any suitable architecture. For example, it may be a stand-alone application wholly-implemented on media device 300. The notification delivery application and/or any instructions for performing any of the embodiments discussed herein may be encoded on computer readable media. Computer readable media includes any media capable of storing data. In some embodiments, the notification delivery application is a client-server based application. Data for use by a thick or thin client implemented on media device 300 or media device 301 is retrieved on-demand by issuing requests to a server remote to the media device 300 or media device 301, respectively. For example, media device 300 may receive inputs from the user via input interface 310 and transmit those inputs to the remote server for processing and generating the corresponding outputs. The generated output is then transmitted to media device 300 for presentation to the user.

Figure 4:
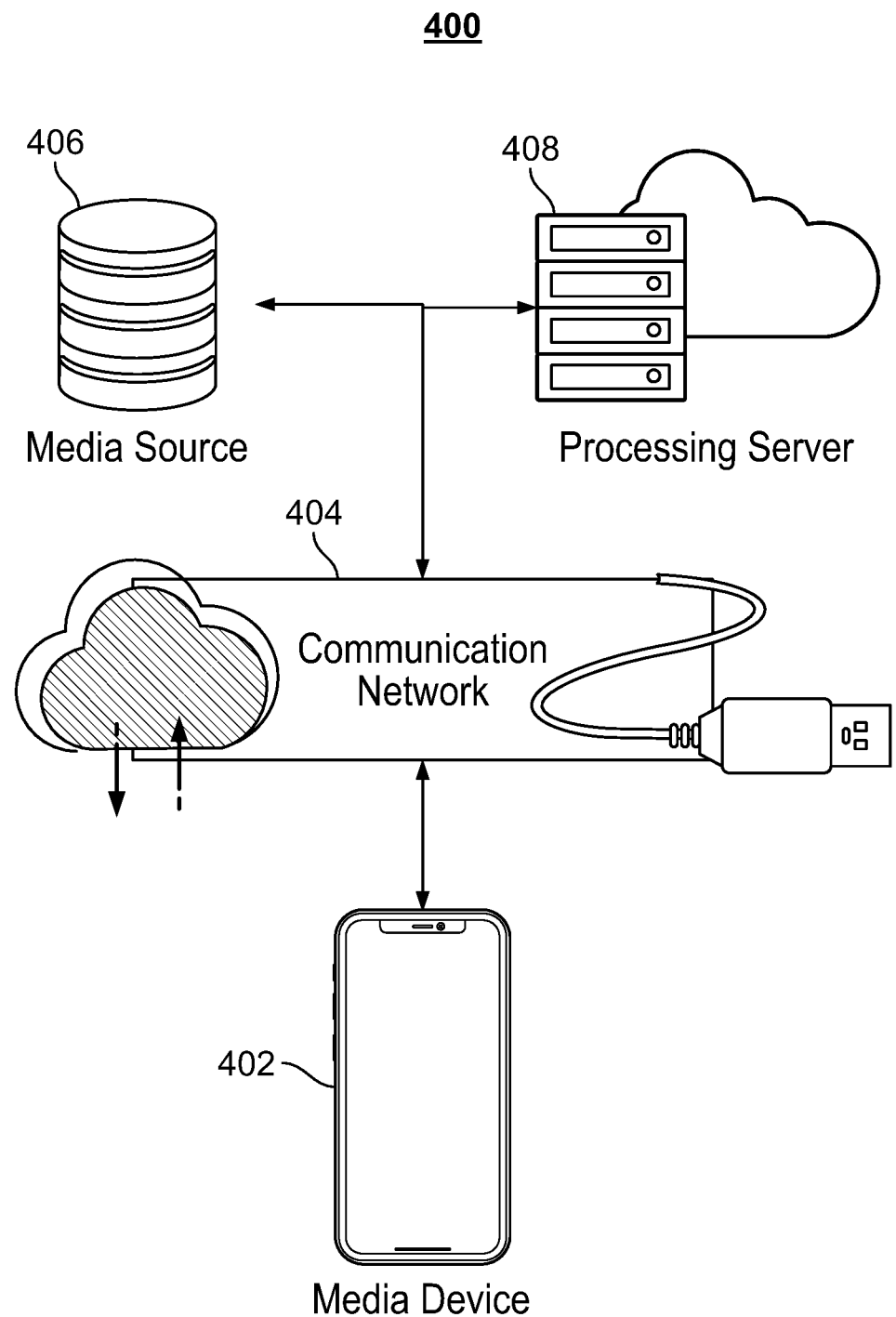
FIG. 4 is a diagram of an illustrative media system in accordance with some embodiments of the disclosure.

FIG. 4 is a diagram of an illustrative media system in accordance with some embodiments of the disclosure. Media device 300 and media device 301 of FIG. 3 can be implemented in system 400 of FIG. 4 as media device 402. Media devices, on which a notification delivery application may be implemented, may function as a standalone device or may be part of a network of devices. Various network configurations of devices may be implemented and are discussed in more detail below. In system 400, there may be multiple media devices but only one of each is shown in FIG. 4 to avoid overcomplicating the drawing. In addition, each user may utilize more than one type of media device and also more than one of each type of media device.

Media device 402 may be coupled to communication network 404. Communication network 404 may be one or more networks including the Internet, a mobile phone network, mobile voice or data network (e.g., a 4G or LTE network), cable network, public switched telephone network, or other types of communications network or combinations of communications networks. Media source 406, processing server 408, and media device 402 may be connected to communication path 404 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between media device 402, media source 406 and processing server 408, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 404.

System 400 includes media source 406 coupled to communication network 404. There may be more than one of media source 406, but only one is shown in FIG. 4 to avoid overcomplicating the drawing. Media source 406 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Media source 406 may be the originator of content (e.g., a television broadcaster, a Webcast provider, etc.) or may not be the originator of content (e.g., an on-demand content provider, an Internet provider of content of broadcast programs for downloading, etc.). Media source 406 may include cable sources, satellite providers, on-demand providers, Internet providers, over-the-top content providers, or other providers of content. Media source 406 may also include a remote media server used to store different types of content (including video content selected by a user), in a location remote from any of the media devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Media source 406 may also provide metadata.

Notification delivery applications may be, for example, stand-alone applications implemented on media devices. For example, the notification delivery application may be implemented as software or a set of executable instructions which may be stored in storage 308, and executed by control circuitry 304 of a media device 402. In some embodiments, notification delivery applications may be client-server applications where only a client application resides on the media device, and server application resides on processing server 408. For example, notification delivery applications may be implemented partially as a client application on control circuitry 304 of media device 402 and partially on processing server 408 as a server application running on control circuitry of processing server 408. When executed by control circuitry of processing server 408, the notification delivery application may instruct the control circuitry to generate the notification delivery application output (e.g., synthesized speech) and transmit the generated output to media device 402. The server application may instruct the control circuitry of the media source 406 to transmit metadata for storage on media device 402. The client application may instruct control circuitry of the receiving media device 402 to generate the notification delivery application output.

Media device 402 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by media device 402 using, for example, a web browser, a notification delivery application, a desktop application, a mobile application, and/or any combination of access applications of the same. Media device 402 may be a cloud client that relies on cloud computing for application delivery, or the media device may have some functionality without access to cloud resources. For example, some applications running on media device 402 may be cloud applications, i.e., applications delivered as a service over the Internet, while other applications may be stored and run on the media device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 3.

Figure 5:
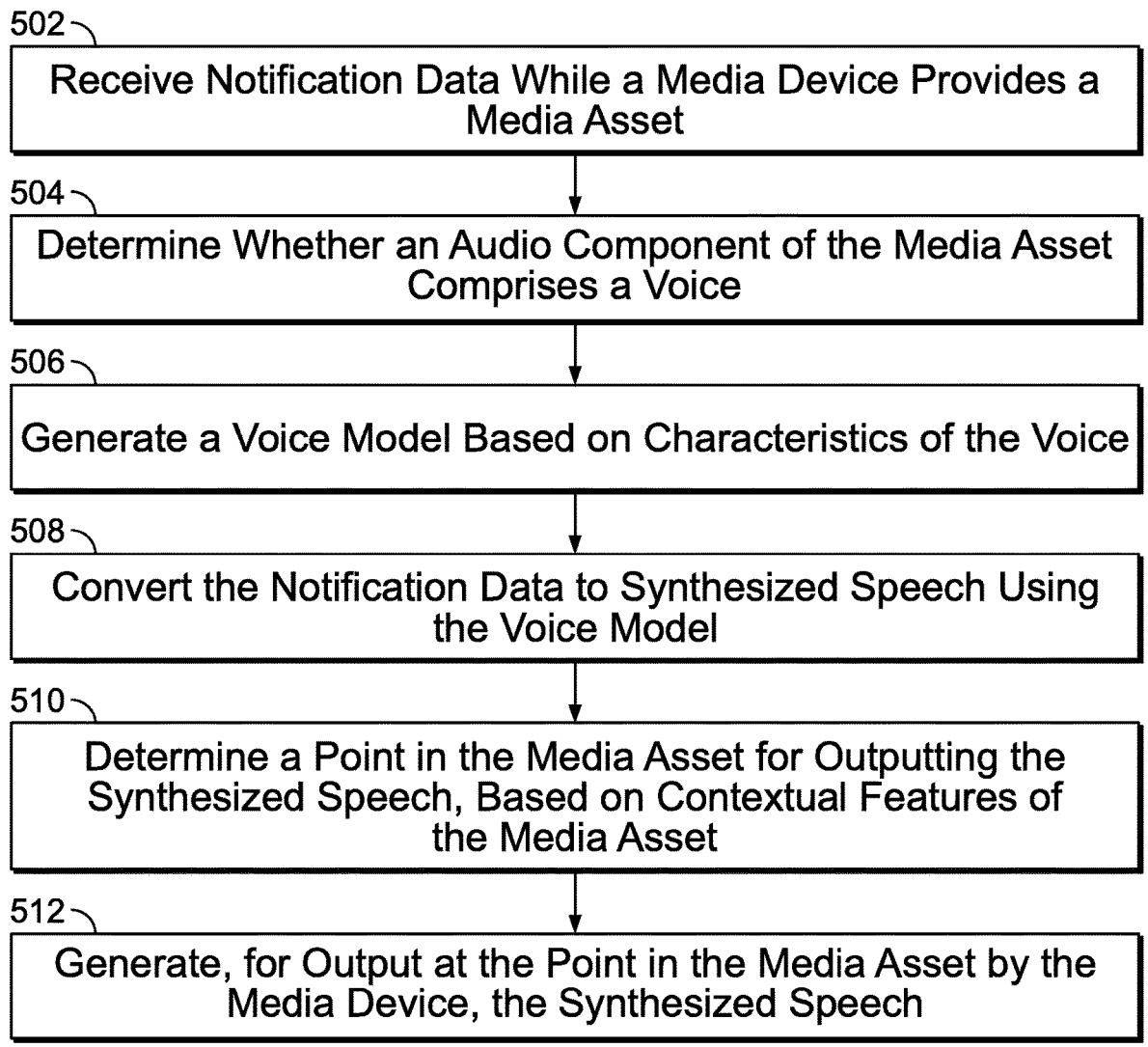
FIG. 5 is a flowchart of a detailed illustrative process for providing notifications as synthesized speech within a media asset, in accordance with some embodiments of the disclosure.

FIG. 5 is a flowchart of a detailed illustrative process for providing notifications as synthesized speech within a media asset, in accordance with some embodiments of the disclosure. Many elements of process 500 have been described above with respect to FIG. 1, and those descriptions have full force and effect with respect to the below description of process 500, and thus details on previously-described elements are omitted for the sake of brevity.

At 502, control circuitry 304 receives notification data while a media device provides a media asset. It should be noted that control circuitry 304 may be on media device 402, on a local device connected to the media device (e.g., a router), a server that can intercept notification data and communicate with the media device (e.g., processing server 408), or any suitable combination thereof. In the latter two cases (i.e., a local device or server), control circuitry 304 may receive notification data that is to be delivered to the media device from a content source. In the former case (i.e., a media device), the notification delivery may receive the notification data directly from the source (e.g., media source 406).

For example, a messaging application such as Messenger™ may generate a notification that is to be delivered to the media device (e.g., the smartphone depicted in FIG. 1). The notification data may include a payload that contains text, audio, images, video, games, or any combination thereof. The notification data may also include metadata that indicates the source of the notification, the destination, timestamps, an identifier, a priority level, or any combination thereof. Suppose that the notification is for a text stating "want to hang out?" as depicted in FIG. 1. Control circuitry 304 thus receives notification data that may indicate a source (e.g., Messenger™), a destination (e.g., the MAC address of the media device), a timestamp (e.g., a time of receipt or transmission), an identifier (e.g., a name of the sender), and a priority level (e.g., low, high, urgent, etc.) as assigned by the source.

Control circuitry 304 further determines whether a media device associated with the notification data is providing a media asset. For example, the media device may be generating for output a media asset such as an audiobook from Audible™. Control circuitry 304 compares timestamp information in the notification data with a time when the media asset is being generated for output at the media asset. In response to identifying a match (i.e., the notification data has a time of receipt that is within a period of time when the media asset is being outputted), control circuitry 304 determines that the notification data has been received while the media asset is being provided by the media device.

At 504, in response to receiving the notification data while the media device provides the media asset, control circuitry 304 determines whether an audio component of the media asset includes a voice. For example, control circuitry 304 retrieves metadata associated with the media asset from a metadata database (e.g., from the source of the media asset, the Internet, storage 308 of media device 402, processing server 408, media source 406, or any combination thereof). The metadata may indicate a content type (e.g., image, video, audio, etc.) of the media asset and additional information about the content within the media asset (e.g., cast, scene identification, subtitles, etc.). Based on the metadata, control circuitry 304 determines, for example, that the audiobook has a content type of "audio" and includes speech from various narrators. The speech from various narrators thus indicates that the audio component includes a voice.

At 506, in response to determining that the audio component includes a voice, control circuitry 304 generates a voice model based on characteristics of the voice. Suppose that one of the narrators in the audiobook is Oprah. In response to detecting a voice (e.g., Oprah's voice) in the media asset, control circuitry 304 may generate a voice model that emulates the vocal patterns of the voice. These vocal patterns are captured in the characteristics of the voice, which include the pronunciation of certain words, an accent, a dialect, frequency of pauses in speech, the speed at which words are spoken, etc. To generate a robust voice model, control circuitry 304 samples audio that features the voice. This audio may be directly retrieved from the media asset or from other sources (e.g., additional content that features Oprah). Using voice recognition and natural language processing, control circuitry 304 analyzes the sample audio to generate a voice model (e.g., stored as a data structure) that includes frequency and temporal information associated with the voice. The data structure may serve as a dictionary that can be used to convert text into a sound. For example, given the word "tomorrow" as an input, control circuitry 304 parses the word into different parts and reconstructs the word as a sound (e.g., 'too-maa-rro') using the frequency and temporal information captured in the voice model. The sound produced would thus emulate Oprah's pronunciation of the word, taking into consideration for example the speed of pronunciation and the accent.

At 508, control circuitry 304 converts the notification data to synthesized speech using the voice model. As discussed previously, the notification data includes a payload of text stating "want to hang out?" and metadata describing additional information associated with the notification. Using natural language processing, the notification delivery system generates the synthesized speech to include any relevant information associated with the notification. Control circuitry 304 may utilize text templates (e.g., stored in storage 308 of media device 402 and/or processing server 408) to deliver the relevant information of the notification to the media device. For example, a text template may be "Hey [name of user], you have received a notification from [sender] on [source] at [time] stating [payload]." Control circuitry 304 enters the relevant information within the respective brackets to produce the text "Hey 'Mark,' you have received a notification from 'Sam' on 'Messenger™' at '10:00 am' stating 'want to hang out?'." Control circuitry 304 then converts, using the voice model, the produced text into synthesized speech. The purpose of providing additional information about the notification to the user is to avoid confusion. Because the synthesized speech emulates Oprah's voice the user may get confused if the synthesized speech only states, "want to hang out?" without any context as to whether the synthesized speech is referring to the content in the audiobook or a notification. It should be noted that control circuitry 304 determines the template to use based on the source of notification data received. For example, a directional notification from a GPS may only require a template such as "Hey [name of user], your GPS says [payload]" that can potentially look like "Hey 'Mark,' your GPS says, 'turn right on Wayne Avenue in 100 meters.'"

At 510, control circuitry 304 determines a point in the media asset for outputting the synthesized speech, based on contextual features of the media asset. The contextual features of the media asset may be indicated in the metadata of the media asset and may include silence periods (e.g., pauses in speech), keywords, time information, speaker information, punctuation information, tonality, etc. Control circuitry 304 provides notification data while aiming to maintain the immersion of a user in the media asset. Abrupt notification delivery may seem unnatural to a user and therefore, the notification delivery system determines a point in the media asset when the notification data can be provided without potentially breaking the user's immersion. The point may be, for example, at the end of a sentence, after a keyword has been said in the media asset, when there is a switch in a voice outputted in the media asset, etc. Control circuitry 304 may interpret the point as a playback position (e.g., a 5-minute 34-second mark), a time relative to the current time (e.g., 30 seconds from the current time), or a marker relative to the content of the media asset (e.g., once the voice says "Hey" in the media asset).

At 512, control circuitry 304 generates, for output at the point in the media asset by the media device, the synthesized speech. The output may be generated via speaker 314 (e.g., speakers on the media device) or speaker 318 (e.g., a smart speaker or a headset). In an example, control circuitry 304 may determine that there is a silence in the audiobook at the end of a chapter. When playback of the audiobook reaches the end of the chapter, control circuitry 304 will generate the synthesized speech. When the output of the synthesized speech has been completed, control circuitry 304 continues normal playback of the media asset.

In some embodiments, when generating, for output at the point in the media asset by the media device, the synthesized speech, control circuitry 304 may output the synthesized speech at a higher or lower frequency than a normal frequency of the voice. For example, the synthesized speech may be generated by control circuitry 304 using a different tonality or emotion. This would ensure that the synthesized speech stands out from the normal voice that is being emulated. For example, the fundamental frequency of Oprah's voice may be 190 Hz in the media asset. Control circuitry 304 may alter the synthesized speech such that the fundamental frequency is 195 Hz. Control circuitry 304 may also break the synthesized speech into multiple portions, each with a different frequency level, to alter the tone or emotion of the synthesized speech. Thus, if the tone of the voice in the media asset is sad, the tone of the synthesized speech can stand out if it is slightly more upbeat.

Figure 6:
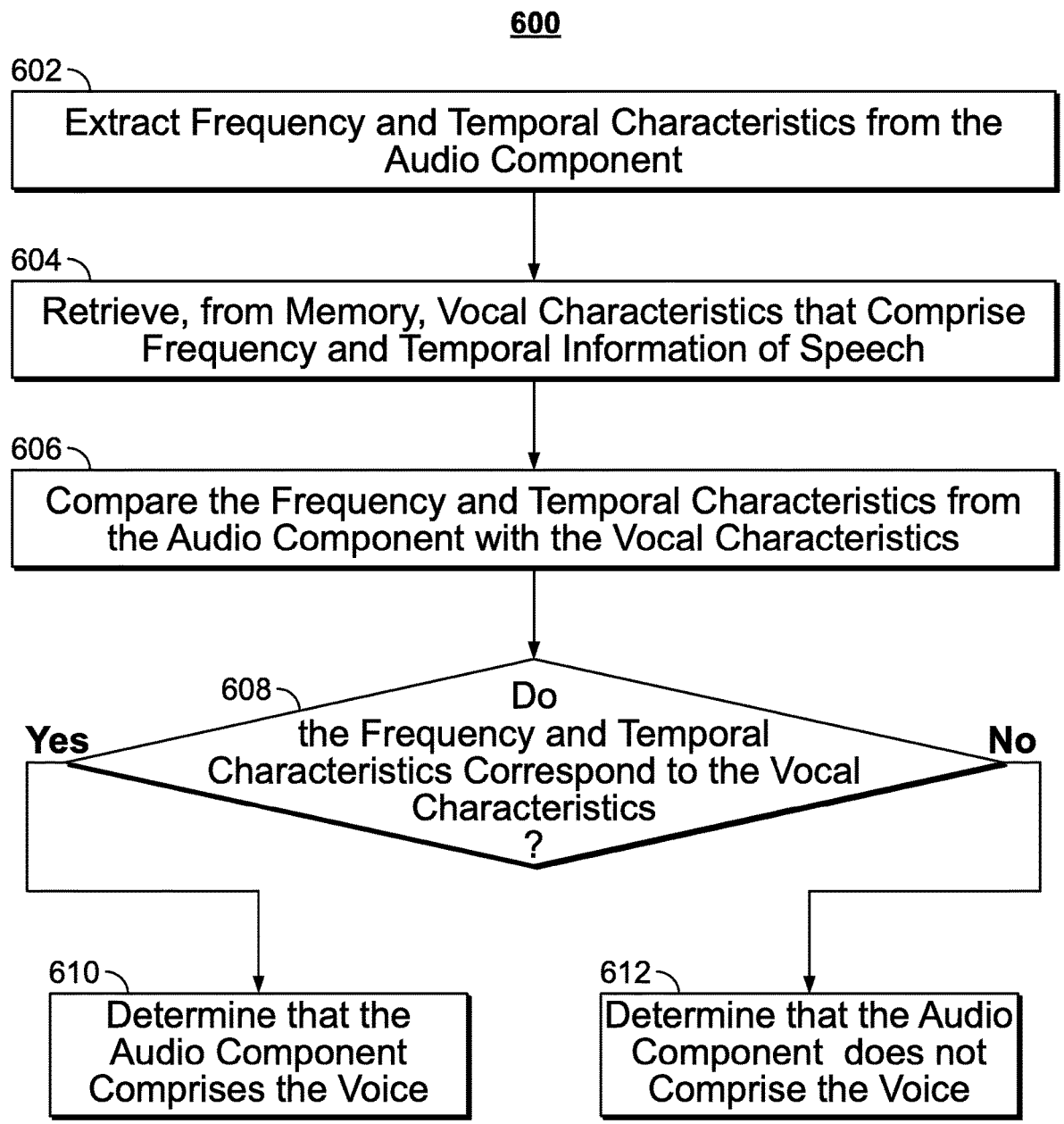
FIG. 6 is a flowchart of an illustrative process for determining whether the audio component of the media asset comprises a voice, in accordance with some embodiments of the disclosure.

FIG. 6 is a flowchart of an illustrative process for determining whether the audio component of the media asset comprises a voice, in accordance with some embodiments of the disclosure. Process 600 begins at 602, in which control circuitry 304 extracts frequency and temporal characteristics from the audio component. For example, control circuitry 304 may use audio decoding techniques that convert the audio signal of the audio component to frequency and temporal information (e.g., via fast fourier transform (fft), inverse fft, etc.). Control circuitry 304 may also use various signal processing filters (e.g., low-pass, band-pass, etc.) to remove background noise and music from the audio component.

At 604, control circuitry 304 retrieves, from storage 308, vocal characteristics that comprise frequency and temporal information of speech. For example, control circuitry 304 may retrieve frequency and temporal graphs (e.g., plotting magnitude/amplitude of a signal in the time and frequency domain) of human speech. Multiple graphs may be retrieved by control circuitry 304 with each graph associated with a gender, age, accent, or any combination thereof.

At 606, control circuitry 304 compares the frequency and temporal characteristics from the audio component with the vocal characteristics. For example, control circuitry 304 may determine a coefficient of correlation between the respective graphs. The coefficient of correlation is a quantitative value (e.g., 0.7) that indicates the amount of similarity between the two signals.

At 608, control circuitry 304 determines whether the frequency and temporal characteristics correspond to the vocal characteristics. For example, control circuitry 304 may compare the coefficient of correlation to a speech threshold (e.g., 0.6) retrieved from storage 308. The speech threshold represents the minimum amount of correlation that indicates that an audio signal includes human speech.

At 610, in response to determining that the frequency and temporal characteristics correspond to the vocal characteristics, control circuitry 304 determines that the audio component comprises the voice. For example, the speech threshold may be 0.6 and the coefficient of correlation between the respective characteristics may be 0.7. As the coefficient of correlation is determined to be greater than the speech threshold, control circuitry 304 determines that the audio component features a human voice (e.g., Oprah's voice).

At 612, in response to determining that the frequency and temporal characteristics do not correspond to the vocal characteristics, control circuitry 304 determines that the audio component does not comprise a voice.

Figure 7:
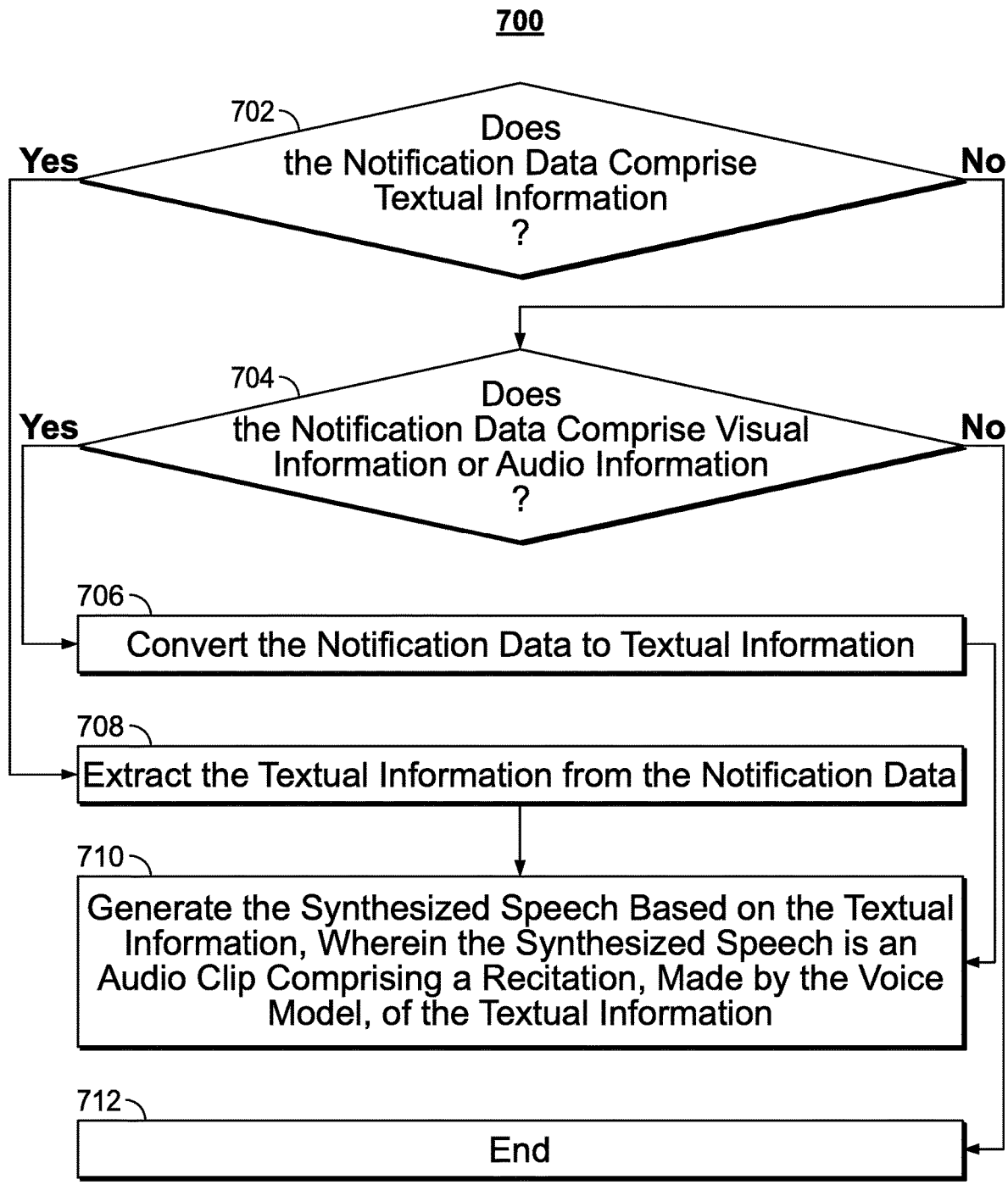
FIG. 7 is a flowchart of an illustrative process for generating synthesized speech based on parsed information in the notification data, in accordance with some embodiments of the disclosure.

FIG. 7 is a flowchart of an illustrative process for generating synthesized speech based on parsed information in the notification data, in accordance with some embodiments of the disclosure. Process 700 begins at 702 in which control circuitry 304 determines whether the notification data comprises textual information. For example, the notification data may consist of a payload that includes text stating "Want to hang out?" Control circuitry 304 may thus determine that the notification data comprises textual information.

At 704, in response to determining that the notification data does not comprise textual information, control circuitry 304 determines whether the notification data comprises visual information and/or audio information. For example, the notification data may consist of a payload that is an image (e.g., a social media post) instead of text.

At 706, in response to determining that the notification data comprises visual information and/or audio information, control circuitry 304 converts the notification data to textual information. Suppose that the notification data consists of a photo. Control circuitry 304 may use image processing (e.g., edge detection, segmentation, etc.) and machine learning (e.g., classification) to identify objects in the notification data. In the case that the notification data consists of audio information (e.g., a voice clip), control circuitry 304 may use speech recognition to convert the audio information into textual information. At 712, in response to determining that the notification data does not comprise visual information and/or audio information, control circuitry 304 ends process 700.

At 708, in response to determining that the notification data comprises textual information, control circuitry 304 extracts the textual information from the notification data. For example, the payload of the notification data may contain the text "want to hang out?" Accordingly, control circuitry 304 may extract the text from the payload and store it in storage 308.

At 710, control circuitry 304 generates the synthesized speech based on the textual information, wherein the synthesized speech is an audio clip comprising a recitation, made by the voice model, of the textual information. For example, control circuitry 304 may convert the textual information (either extracted directly from the payload of the notification data or converted from visual/audio information) to an audio clip. As described previously, the voice model may be a neural network that converts input text into synthesized speech. The input text may contain additional text (e.g., "Hey Mark") along with the textual information from the notification data.

Figure 8:
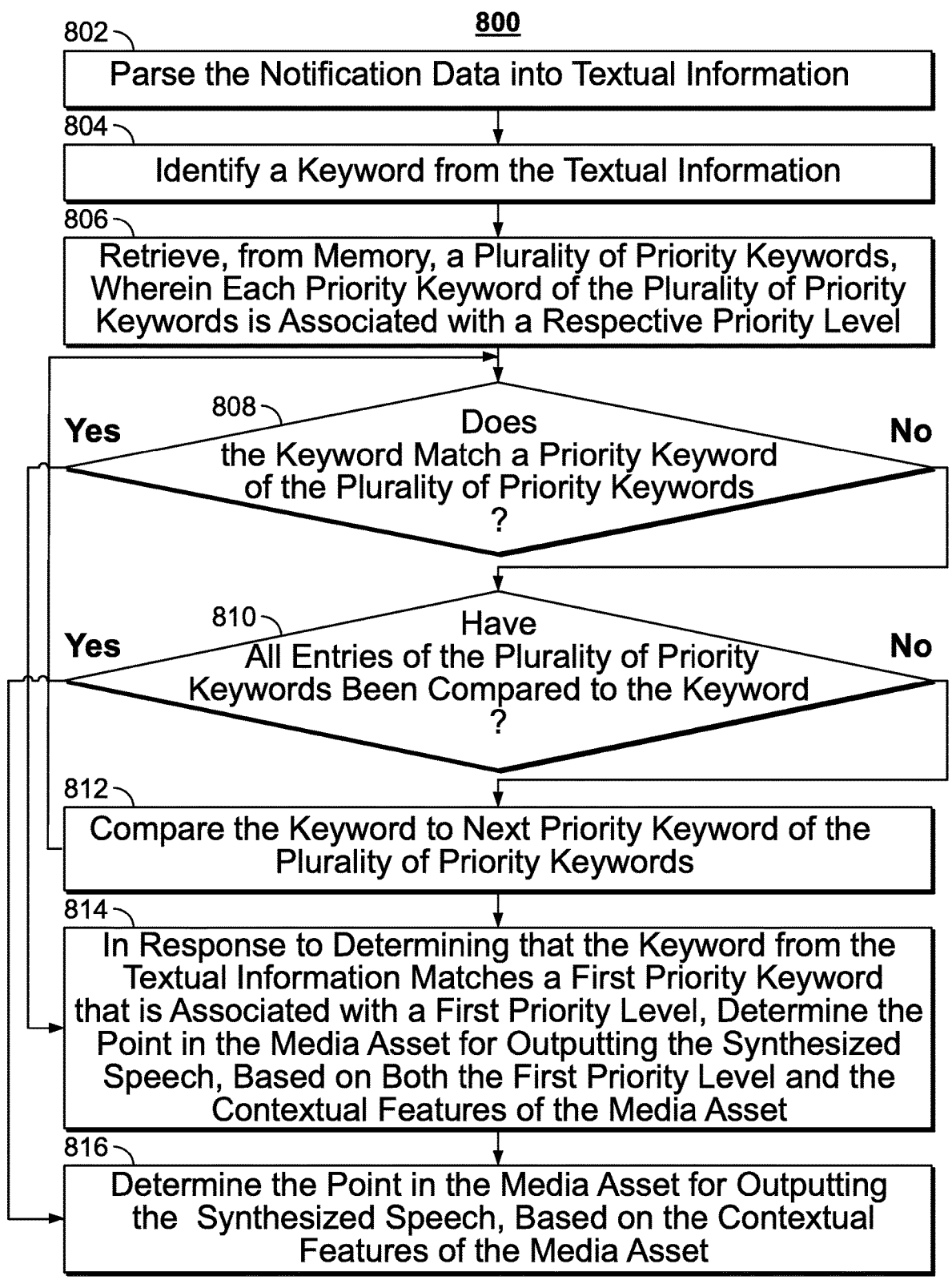
FIG. 8 is a flowchart of an illustrative process for determining a point in the media asset to output the synthesized speech based on keywords in the notification, in accordance with some embodiments of the disclosure.

FIG. 8 is a flowchart of an illustrative process for determining a point in the media asset to output the synthesized speech based on keywords in the notification, in accordance with some embodiments of the disclosure. Process 800 begins at 802 in which control circuitry 304 parses the notification data into textual information.

At 804, control circuitry 304 identifies a keyword from the textual information. When determining the point in the media asset for outputting the synthesized speech, control circuitry 304 may take into consideration the importance or priority of the notification data. More specifically, control circuitry 304 may parse the notification data into textual information and identify a keyword from the textual information. For example, the keyword may be "urgent."

At 806, control circuitry 304 retrieves, from storage 308, a plurality of priority keywords, wherein each priority keyword of the plurality of priority keywords is associated with a respective priority level. For example, the plurality of priority keywords may be organized in a data structure with the priority keywords such as "emergency," "urgent," and "important," among several others.

At 808, control circuitry 304 determines whether the keyword matches a priority keyword of the plurality of priority keywords. For example, the keyword "urgent" is compared to the first entry of the data structure "emergency."

At 810, in response to determining that the keyword does not match a priority keyword, control circuitry 304 determines whether all entries of the plurality of priority keywords have been compared to the keyword. Control circuitry 304 may determine that the size of the data structure is 5 (e.g., includes 5 entries). Therefore, 4 entries remain that have not been compared to the keyword. If not all entries have been compared, control circuitry 304 compares the keyword to next priority keyword of the plurality of priority keywords. The loop between 808, 810, and 812 is maintained until a match is found at 808, or all entries have been compared in 810. In this example, the next priority keyword is "urgent."

At 814, in response to determining that the keyword from the textual information matches a first priority keyword (e.g., "urgent" matches "urgent") that is associated with a first priority level, control circuitry 304 determines the point in the media asset for outputting the synthesized speech, based on both the first priority level and the contextual features of the media asset. For example, there may be two priority levels (e.g., "high priority" and "low priority"). The term "urgent" may be associated with "high priority." In response to determining that the notification data is of "high priority," rather than outputting the synthesized speech at the end of a chapter in the audiobook, as discussed in the previous examples, control circuitry 304 may output the synthesized speech at the end of the next sentence that is being recited in the audiobook. In other words, the synthesized speech may be outputted more immediately.

At 816, in response to determining that all entries of the plurality of priority keywords have been compared to the keyword without a match, control circuitry 304 determines the point in the media asset for outputting the synthesized speech, based on the contextual features of the media asset. For example, control circuitry 304 may determine that the notification data is not of high-priority and may output the synthesized speech via speaker 314 or speaker 318 at a position of the media asset based on another feature (e.g., the recitation of a keyword in the media asset).

Figure 9:
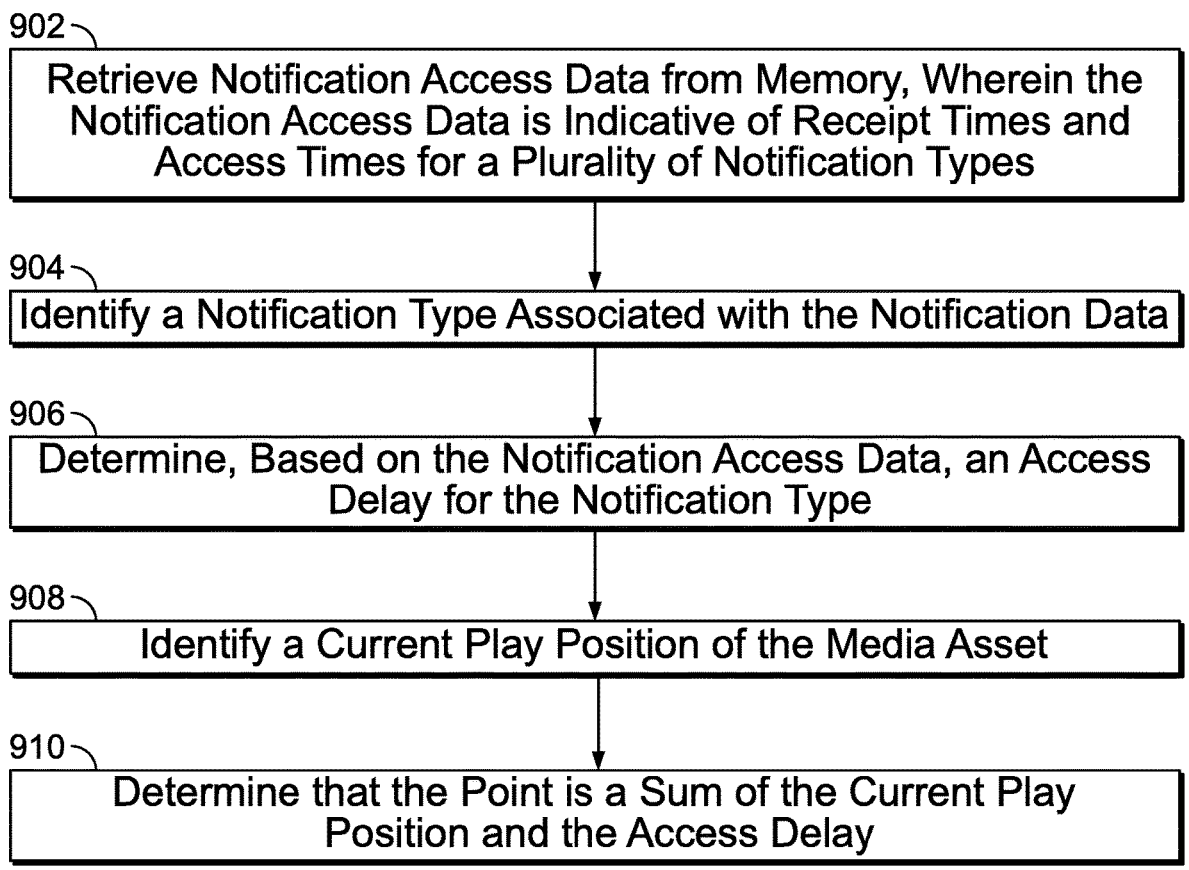
FIG. 9 is a flowchart of an illustrative process for determining a point in the media asset to output the synthesized speech based on notification access times, in accordance with some embodiments of the disclosure.

FIG. 9 is a flowchart of an illustrative process for determining a point in the media asset to output the synthesized speech based on notification access times, in accordance with some embodiments of the disclosure. Process 900 starts at 902 in which control circuitry 304 retrieves notification access data from storage 308, wherein the notification access data is indicative of receipt times and access times for a plurality of notification types. For example, storage 308 of the media device may store notification access data that is indicative of receipt times and access times for a plurality of notification types (e.g., a timestamp of when a notification was delivered to a user and a timestamp of when the user actually accessed the notification).

At 904, control circuitry 304 identifies a notification type associated with the notification data. The notification type is based on the source of the notification and the content of the notification data payload. Examples of the notification type may include "directional notification," "social media notification," "administrative notification," "calendar notification," etc., but may also include classifications specific to an application such as "Messenger™ message notification," "Outlook™ calendar notification," etc. For example, a text from Messenger™ may be categorized as a social media notification or a Messenger™ message notification.

At 906, control circuitry 304 determines, based on the notification access data, an access delay for the notification type. The access delay represents a time difference between when a notification of the notification type was received and when the notification of the notification type was accessed. The access delay may also be an average time difference calculated over a period of time. Suppose that the notification type is a Messenger™ message notification. Control circuitry 304 may determine, based on the notification access data, that the access delay for Messenger™ message notifications is 1 minute which indicates that the user typically accesses this type of notification approximately 1 minute after it has been received on the media device.

At 908, control circuitry 304 identifies a current play position of the media asset (e.g., the 5-minute 34-second mark of the audiobook). At 910, control circuitry 304 determines that the point is a sum of the current play position and the access delay. For example, control circuitry 304 may calculate the point for outputting the synthesized speech as the sum of the current play position and the access delay (e.g., the 6-minute 34-second mark of the audiobook). In a real-time example, control circuitry 304 will output the synthesized speech 1 minute from the current time via speaker 314 or speaker 318.

Figure 10:
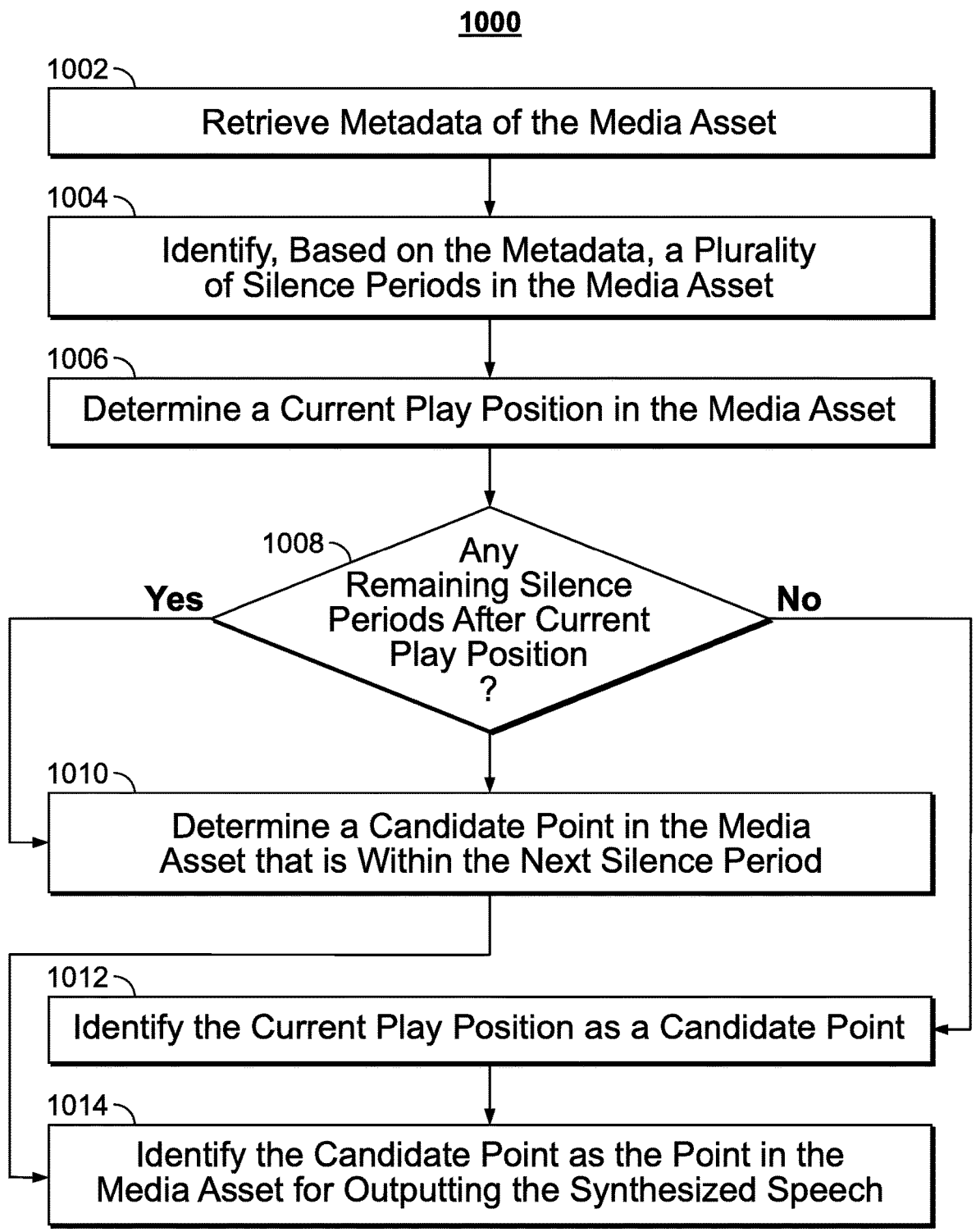
FIG. 10 is a flowchart of an illustrative process for determining a point in the media asset to output the synthesized speech based on silence periods in the media asset, in accordance with some embodiments of the disclosure.

FIG. 10 is a flowchart of an illustrative process for determining a point in the media asset to output the synthesized speech based on silence periods in the media asset, in accordance with some embodiments of the disclosure. Process 1000 begins at 1002 in which control circuitry 304 retrieves metadata of the media asset. The metadata of the media asset may indicate timestamps in the media asset in which words are recited or a voice is outputted.

At 1004, control circuitry 304 identifies, based on the metadata, a plurality of silence periods in the media asset. A silence period represents a time period in the media asset in which no voices are detected or a pause is taken (e.g., at the end of a sentence).

At 1006, control circuitry 304 determines a current play position in the media asset. For example, the current play position may be the 5-minute 16-second mark in the media asset. At 1008, control circuitry 304 determines whether there are any remaining silence periods after the current play position. For example, there may be a silence period in the media asset between the 5-minute 34-second mark and the 5-minute 40-second mark.

At 1010, in response to determining that there is at least one remaining silence period after current play position, control circuitry 304 determines a candidate point in the media asset that is within the next silence period. For example, control circuitry 304 may select a candidate point at the 5-minute 36-second mark for initiating output of the synthesized speech. This candidate point is within the silence period identified at 1008.

At 1012, in response to determining that there is not at least one remaining silence period after current play position, control circuitry 304 identifies the current play position as a candidate point. For example, there may be no silences in the media asset (e.g., the speaker continuously talks during the remainder of the media asset). As a result, control circuitry 304 may determine that the 5-minute 16-second mark of the media asset is the candidate point.

At 1014, control circuitry 304 identifies the candidate point as the point in the media asset for outputting the synthesized speech via speaker 314 or speaker 318. This signifies that control circuitry 304 will output the synthesized speech at the candidate point (e.g., 5-minute 36-second mark).

Figure 11:
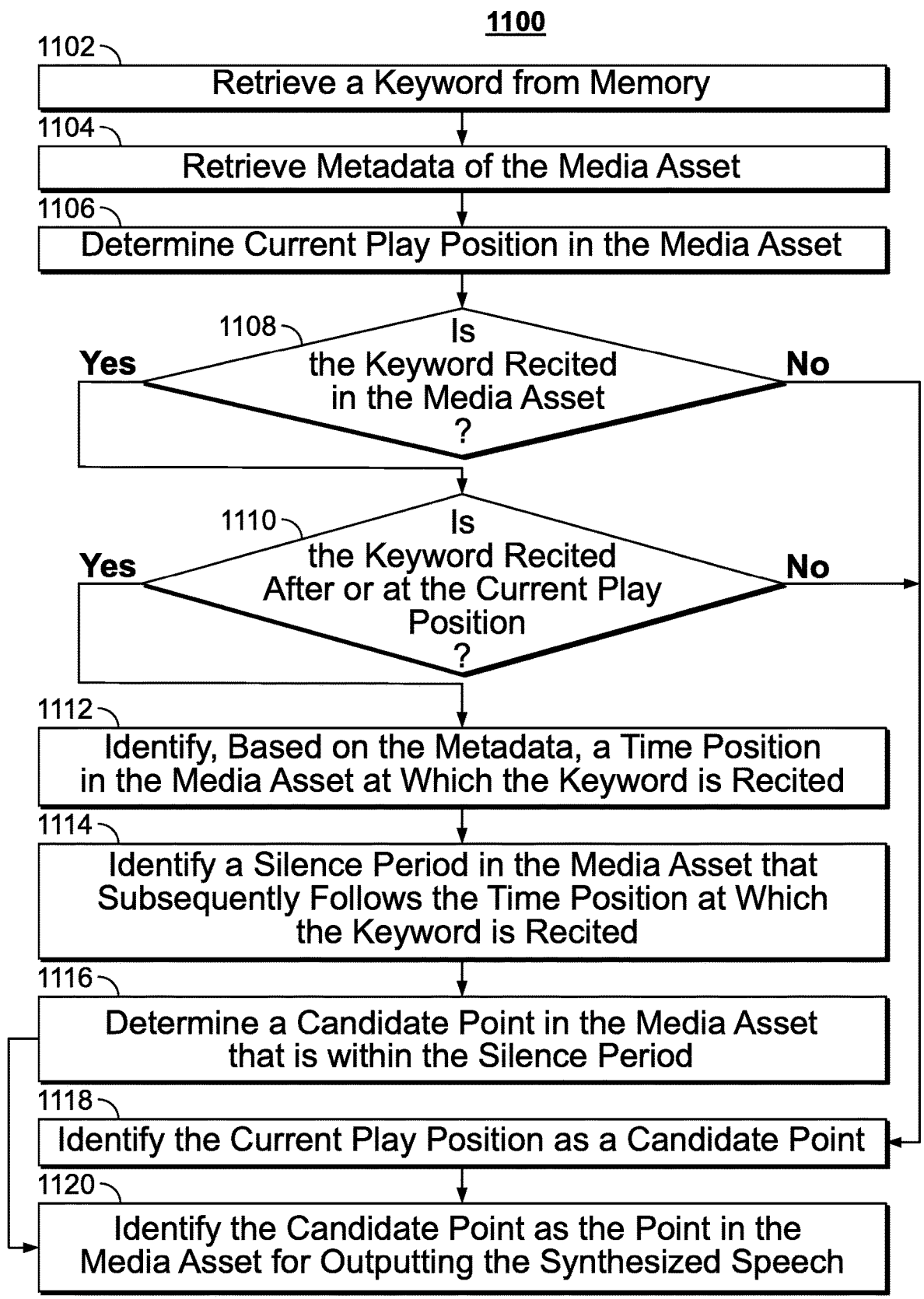
FIG. 11 is a flowchart of an illustrative process for determining a point in the media asset to output the synthesized speech based on keywords recited in the media asset, in accordance with some embodiments of the disclosure.

FIG. 11 is a flowchart of an illustrative process for determining a point in the media asset to output the synthesized speech based on keywords recited in the media asset, in accordance with some embodiments of the disclosure. Process 1100 begins at 1102. In some embodiments, when determining the point in the media asset for outputting the synthesized speech, control circuitry 304 may search for keywords in the media asset that can be followed by the synthesized speech. In this case, the contextual features of the media asset indicate keywords such as "hey," "listen," "look," etc. Accordingly, at 1102, control circuitry 304 retrieves a keyword (e.g., "hey") from storage 308.

At 1104, control circuitry 304 retrieves metadata of the media asset. The metadata of the media asset may include a transcript of words recited in the media asset. At 1106, control circuitry 304 determines the current play position in the media asset. Suppose that the current play position is the 5-minute 16-second mark of the media asset.

At 1108, control circuitry 304 determines whether the keyword is recited in the media asset. For example, control circuitry 304 may identify, based on the metadata, a time position in the media asset at which the keyword is recited. The metadata may contain voice recognition information and timestamps of when a word is said. Control circuitry 304 may determine that the keyword "hey" is said by the voice in the media asset at the 5-minute 34-second mark.

At 1110, in response to determining that the keyword is recited in the media asset, control circuitry 304 determines whether the keyword is recited at least after or at the current play position. For example, because control circuitry 304 determines that the current play position is the 5-minute 16-second mark of the media asset and the keyword "hey" is recited at the 5-minute 34-second mark, control circuitry 304 determines that the keyword is recited after the current play position.

At 1112, in response to determining that the keyword is recited after or at the current play position, control circuitry 304 identifies, based on the metadata, a time position in the media asset at which the keyword is recited. For example, there may be multiple time positions in which the keyword is recited. Control circuitry 304 selects one of those time positions (e.g., the 5-minute 34-second mark).

At 1114, control circuitry 304 identifies a silence period in the media asset that subsequently follows the time position at which the keyword is recited. For example, right after the word "hey" is said, there may be a brief silence between the word "hey" and the next word said subsequently (e.g., between the 5-minute 34-second mark and the 5-minute 36-second mark).

At 1116, control circuitry 304 determines a candidate point in the media asset that is within the silence period. For example, control circuitry 304 may determine the candidate point to be the 5-minute 35-second mark of the media asset.

At 1118, in response to determining that the keyword is not recited in the media asset or is not recited after or at the current play position, control circuitry 304 identifies the current play position as a candidate point. For example, the current play position may be the 5-minute 16-second mark of the media asset.

At 1120, control circuitry 304 identifies the candidate point as the point in the media asset for outputting the synthesized speech via speaker 314 or speaker 318.

Figure 12:
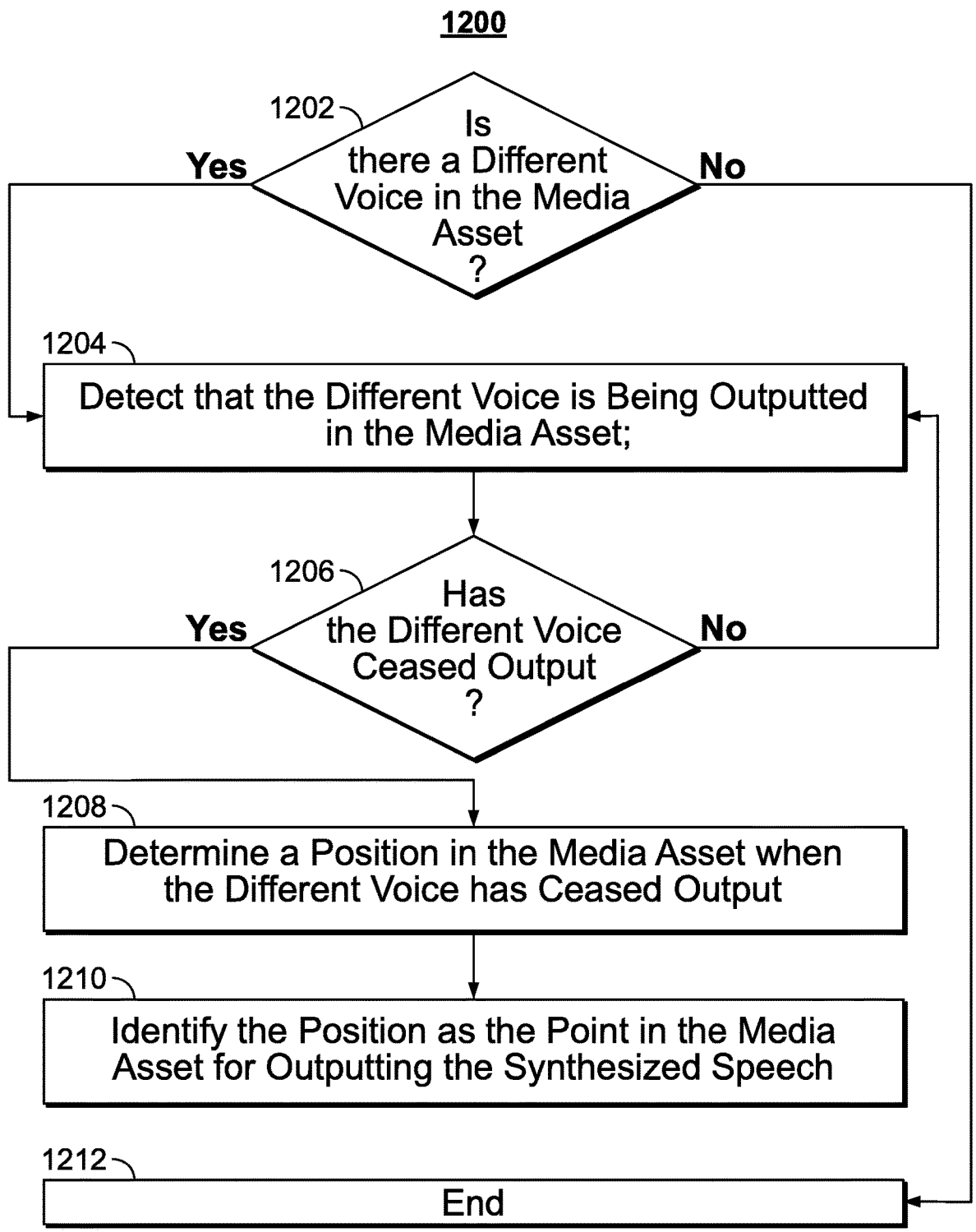
FIG. 12 is a flowchart of an illustrative process for determining a point in the media asset to output the synthesized speech based on the output of a different voice, in accordance with some embodiments of the disclosure.

FIG. 12 is a flowchart of an illustrative process for determining a point in the media asset to output the synthesized speech based on the output of a different voice, in accordance with some embodiments of the disclosure. Process 1200 starts at 1202 in which control circuitry 304 determines whether there is a different voice in the media asset. In some embodiments, when determining the point in the media asset for outputting the synthesized speech, control circuitry 304 may attempt to grab the user's attention by using contrasting voices. For example, control circuitry 304 may detect that a different voice is being outputted in the media asset. For example, the audiobook may have a second narrator that begins reading the book aloud. In response to determining that there is not different voice in the media asset, control circuitry 304 ends process 1200 at 1212.

At 1204, in response to determining that there is a different voice in the media asset, control circuitry 304 detects that the different voice is being outputted in the media asset. For example, control circuitry 304 may determine, based on the metadata of the media asset, that the output of the different voice commences in the media asset at the 5-minute mark of the media asset. Control circuitry 304 further determines that the current play position is the 5-minute 16-second mark of the media asset. Therefore, the different voice (e.g., of the second narrator) is being outputted.

At 1206, control circuitry 304 determines whether the different voice has ceased output. For example, the voice may stop reading the book at the 6-minute mark. At 1208, in response to determining that the different voice has ceased output, control circuitry 304 determines a position in the media asset when the different voice has ceased output (e.g., the 6-minute mark).

At 1210, control circuitry 304 identifies the position as the point in the media asset for outputting the synthesized speech. Because the synthesized speech is based on a voice model that is unique from the different voice, control circuitry 304 is able to deliver the notification data to the user in a distinctive audio output via speaker 314 or speaker 318 while still maintaining media immersion.

Figure 13:
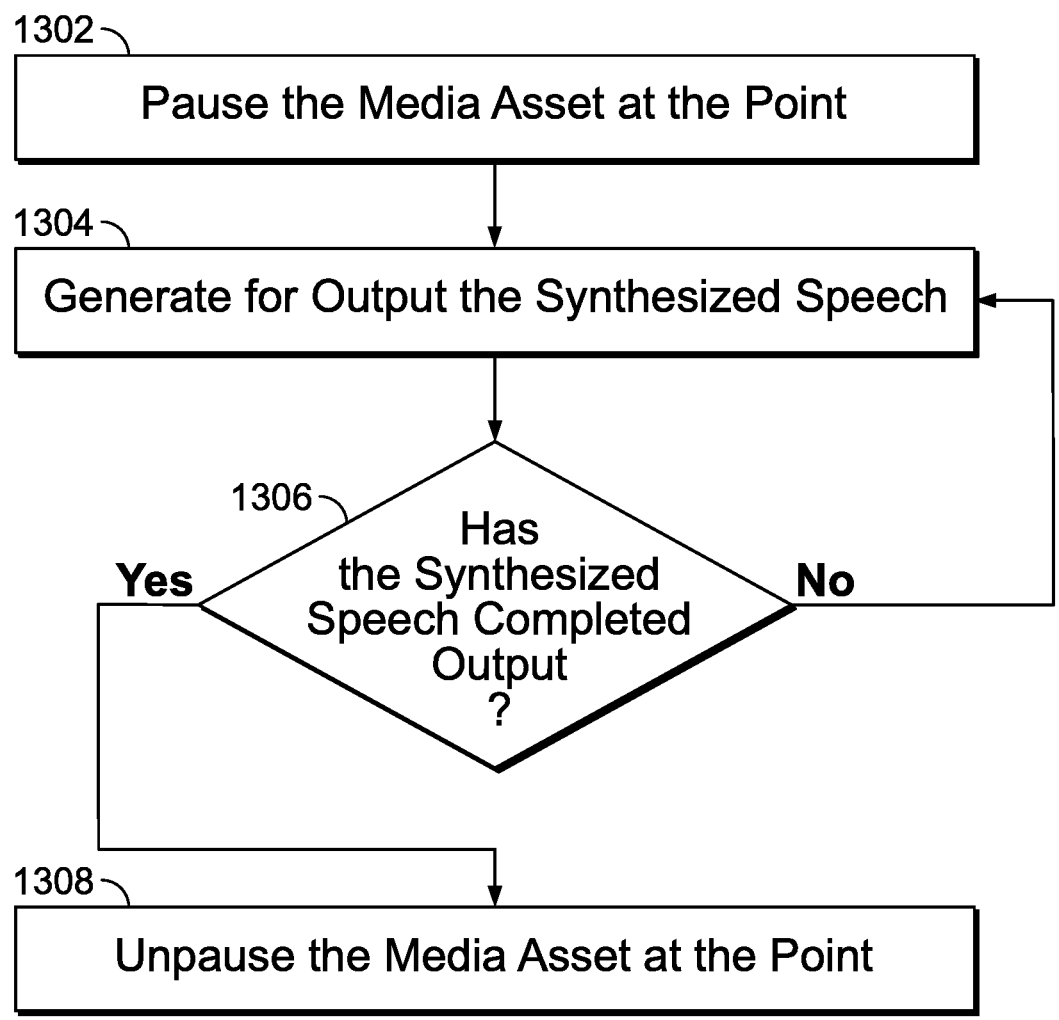
FIG. 13 is a flowchart of an illustrative process for generating the synthesized speech at a point in the media asset, in accordance with some embodiments of the disclosure.

FIG. 13 is a flowchart of an illustrative process for generating the synthesized speech at a point in the media asset, in accordance with some embodiments of the disclosure. In some embodiments, the synthesized speech is outputted by control circuitry 304 over the media asset (e.g., at a different volume) such that both the synthesized speech and the media asset are outputted simultaneously. Process 1300 describes inserting the synthesized speech into the media asset, as depicted in FIG. 2. Process 1300 starts at 1302 in which control circuitry 304 pauses the media asset at the point (e.g., at the beginning of silence period 206). At 1304, control circuitry 304 generates for output the synthesized speech (e.g., as synthesized speech 210). At 1306, control circuitry 304 determines whether the output of the synthesized speech has been completed (e.g., whether playback has reached the end of synthesized speech 210). At 1308, in response to determining that the output of the synthesized speech has been completed, control circuitry 304 un-pauses the media asset at the point. Otherwise, in response to determining that the output of the synthesized speech has not been completed, control circuitry 304 continues to output the synthesized speech at 1304 via speaker 314 or speaker 318.

It should be noted that processes 500-1300 or any step thereof could be performed on, or provided by, any of the devices shown in FIGS. 3-4. For example, the processes may be executed by control circuitry 304 (FIG. 3) as instructed by a notification delivery application implemented on media device 402 and/or processing server 408. In addition, one or more steps of a process may be incorporated into or combined with one or more steps of any other process or embodiment (e.g., steps from process 500 may be combined with steps from process 800). In addition, the steps and descriptions described in relation to FIGS. 5-13 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing notifications without breaking media immersion, the method comprising:
   receiving notification data while a media device provides a media asset;
   in response to receiving the notification data while the media device provides the media asset:
      determining whether an audio component of the media asset comprises a voice;
      in response to determining that the audio component comprises the voice, generating a text-to-voice model based on characteristics of the voice;
      converting the notification data to synthesized speech using the text-to-voice model;
      determining a playback position in the media asset for outputting the synthesized speech, based on the notification data; and
      generating, for output at the playback position in the media asset by the media device, the synthesized speech.

2. The method of claim 1, wherein determining whether the audio component of the media asset comprises the voice comprises:
   extracting frequency and temporal characteristics from the audio component;

retrieving, from memory, vocal characteristics that comprise frequency and temporal information of speech;

comparing the frequency and temporal characteristics from the audio component with the vocal characteristics; and in response to determining that the frequency and temporal characteristics correspond to the vocal characteristics, determining that the audio component comprises the voice.

3. The method of claim 1, wherein converting the notification data to the synthesized speech using the text-to-voice model comprises:

identifying textual information in the notification data; and generating the synthesized speech based on the textual information, wherein the synthesized speech is an audio clip comprising a recitation, made by the text-to-voice model, of the textual information.

4. The method of claim 1, wherein determining the playback position in the media asset for outputting the synthesized speech further comprises:

parsing the notification data into textual information;

identifying a keyword from the textual information;

retrieving, from memory, a plurality of priority keywords, wherein each priority keyword of the plurality of priority keywords is associated with a respective priority level;

comparing the keyword from the textual information to each priority keyword of the plurality of priority keywords; and in response to determining that the keyword from the textual information matches a first priority keyword that is associated with a first priority level, determining the playback position in the media asset for outputting the synthesized speech, based on both the first priority level and the contextual features of the media asset.

5. The method of claim 1, wherein determining the playback position in the media asset for outputting the synthesized speech comprises:

retrieving notification access data from memory, wherein the notification access data is indicative of receipt times and access times for a plurality of notification types;

identifying a notification type associated with the notification data;

determining, based on the notification access data, an access delay for the notification type, wherein the access delay represents a time difference between when a notification of the notification type was received and when the notification of the notification type was accessed;

identifying a current play position of the media asset; and determining that the playback position is a sum of the current play position and the access delay.

6. The method of claim 1, wherein determining the playback position in the media asset for outputting the synthesized speech is further based on contextual features of the media asset, and further comprises:

determining the contextual features of the media asset, wherein the contextual features comprise silence periods, by:

retrieving metadata of the media asset; and identifying, based on the metadata, a plurality of silence periods in the media asset, wherein a silence period of the plurality of silence periods is indicative of a time period in the media asset in which no voices are detected;

determining a candidate playback position in the media asset that is within the silence period;

identifying the candidate playback position as the playback position in the media asset for outputting the synthesized speech.

7. The method of claim 6, wherein the contextual features comprise keywords and wherein determining the playback position in the media asset for outputting the synthesized speech comprises:

retrieving a keyword from memory;

retrieving metadata of the media asset;

identifying, based on the metadata, a time position in the media asset at which the keyword is recited;

identifying a silence period in the media asset that subsequently follows the time position at which the keyword is recited;

determining a candidate playback position in the media asset that is within the silence period;

identifying the candidate playback position as the playback position in the media asset for outputting the synthesized speech.

8. The method of claim 1, wherein determining the playback position in the media asset for outputting the synthesized speech comprises:

detecting that a different voice is being outputted in the media asset;

determining a position in the media asset when the different voice ceases output; and identifying the position as the playback position in the media asset for outputting the synthesized speech.

9. The method of claim 1, wherein generating, for output at the playback position in the media asset by the media device, the synthesized speech comprises:

pausing the media asset at the playback position;

in response to pausing the media asset at the playback position, generating for output the synthesized speech; and unpausing the media asset at the playback position in response to completing output of the synthesized speech.

10. The method of claim 1, wherein generating, for output at the playback position in the media asset by the media device, the synthesized speech, comprises outputting the synthesized speech at a higher frequency than a normal frequency of the voice.

11. A system for providing notifications without breaking media immersion, the system comprising:

audio generating circuitry;

control circuitry configured to:

receive notification data while a media device provides a media asset;

in response to receiving the notification data while the media device provides the media asset:

determine whether an audio component of the media asset comprises a voice;

in response to determining that the audio component comprises the voice, generate a text-to-voice model based on characteristics of the voice;

convert the notification data to synthesized speech using the text-to-voice model;

determine a playback position in the media asset for outputting the synthesized speech, based on the notification data; and generating, via audio generating circuitry, the synthesized speech for output at the playback position in the media asset by the media device.

12. The system of claim 11, wherein the control circuitry, when determining whether the audio component of the media asset comprises the voice, is further configured to:
extract frequency and temporal characteristics from the audio component;
retrieve, from memory, vocal characteristics that comprise frequency and temporal information of speech;
compare the frequency and temporal characteristics from the audio component with the vocal characteristics; and
in response to determining that the frequency and temporal characteristics correspond to the vocal characteristics, determine that the audio component comprises the voice.

13. The system of claim 11, wherein the control circuitry, when converting the notification data to the synthesized speech using the text-to-voice model, is further configured to:
identify textual information in the notification data; and
generate the synthesized speech based on the textual information, wherein the synthesized speech is an audio clip comprising a recitation, made by the text-to-voice model, of the textual information.

14. The system of claim 11, wherein the control circuitry, when determining the playback position in the media asset for outputting the synthesized speech, is further configured to:
parse the notification data into textual information;
identify a keyword from the textual information;
retrieve, from memory, a plurality of priority keywords, wherein each priority keyword of the plurality of priority keywords is associated with a respective priority level;
compare the keyword from the textual information to each priority keyword of the plurality of priority keywords; and
in response to determining that the keyword from the textual information matches a first priority keyword that is associated with a first priority level, determine the playback position in the media asset for outputting the synthesized speech, based on both the first priority level and the contextual features of the media asset.

15. The system of claim 11, wherein the control circuitry, when determining the playback position in the media asset for outputting the synthesized speech, is further configured to:
retrieve notification access data from memory, wherein the notification access data is indicative of receipt times and access times for a plurality of notification types;
identify a notification type associated with the notification data;
determine, based on the notification access data, an access delay for the notification type, wherein the access delay represents a time difference between when a notification of the notification type was received and when the notification of the notification type was accessed;
identify a current play position of the media asset; and
determine that the playback position is a sum of the current play position and the access delay.

16. The system of claim 11, wherein the control circuitry, when determining the playback position in the media asset for outputting the synthesized speech further based on contextual features of the media asset, is further configured to:
determine the contextual features of the media asset, wherein the contextual features comprise silence periods, by:
retrieving metadata of the media asset; and
identifying, based on the metadata, a plurality of silence periods in the media asset, wherein a silence period of the plurality of silence periods is indicative of a time period in the media asset in which no voices are detected;
determine a candidate playback position in the media asset that is within the silence period;
identify the candidate playback position as the playback position in the media asset for outputting the synthesized speech.

17. The system of claim 16, wherein the contextual features comprise keywords and wherein the control circuitry, when determining the playback position in the media asset for outputting the synthesized speech, is further configured to:
retrieve a keyword from memory;
retrieve metadata of the media asset;
identify, based on the metadata, a time position in the media asset at which the keyword is recited;
identify a silence period in the media asset that subsequently follows the time position at which the keyword is recited;
determine a candidate playback position in the media asset that is within the silence period;
identify the candidate playback position as the playback position in the media asset for outputting the synthesized speech.

18. The system of claim 11, wherein the control circuitry, when determining the playback position in the media asset for outputting the synthesized speech, is further configured to:
detect that a different voice is being outputted in the media asset;
determine a position in the media asset when the different voice ceases output; and
identify the position as the playback position in the media asset for outputting the synthesized speech.

19. The system of claim 11, wherein the control circuitry, when generating, via the audio generating circuitry, the synthesized speech for output at the playback position in the media asset by the media device, is further configured to:
pause the media asset at the playback position;
in response to pausing the media asset at the playback position, generate for output the synthesized speech; and
unpause the media asset at the playback position in response to completing output of the synthesized speech.

20. The system of claim 11, wherein the control circuitry, when generating, via the audio generating circuitry, the synthesized speech for output at the playback position in the media asset by the media device, is further configured to output the synthesized speech at a higher frequency than a normal frequency of the voice.

* * * * *